United States Patent
Bradley

[11] Patent Number: 5,951,141
[45] Date of Patent: Sep. 14, 1999

[54] HEAD MOUNTED ILLUMINATION DEVICE

[76] Inventor: Paul David Bradley, 3401 A Jackson Ct., Tustin, Calif. 92782

[21] Appl. No.: 09/193,809
[22] Filed: Nov. 17, 1998
[51] Int. Cl.[6] ................................................ F21L 15/14
[52] U.S. Cl. .......................... 362/105; 362/106; 362/253
[58] Field of Search .................................. 362/103, 105, 362/106, 253; 2/209, 422, 906

[56] References Cited

U.S. PATENT DOCUMENTS

| | | | |
|---|---|---|---|
| 3,665,451 | 5/1972 | Keith | 262/105 |
| 4,969,069 | 11/1990 | Eichost | 362/105 |
| 5,083,246 | 1/1992 | Lambert | 362/105 |
| 5,138,722 | 8/1992 | Urella et al. | 2/209 |
| 5,353,205 | 10/1994 | Hudak | 362/105 |
| 5,438,494 | 8/1995 | Harlan | 362/106 |
| 5,463,538 | 10/1995 | Womack | 362/106 |

Primary Examiner—Y. Quach
Attorney, Agent, or Firm—Goldstein & Canino

[57] ABSTRACT

A head mounted illumination device including a light source disposed within a housing. The light source includes a plurality of lights disposed within the housing. The housing is securable to a mouthpiece of a headset to facilitate securement of the light source to the headset. An activation button is disposed within the housing. The activation button is in communication with the light source. The activation button includes a contact switch extending outwardly of the housing. The contact switch aligns with a lip of a user. A power source is securable to the headset. The power source includes wiring extending outwardly therefrom. The wiring couples with the activation button to facilitate communication therewith.

4 Claims, 3 Drawing Sheets

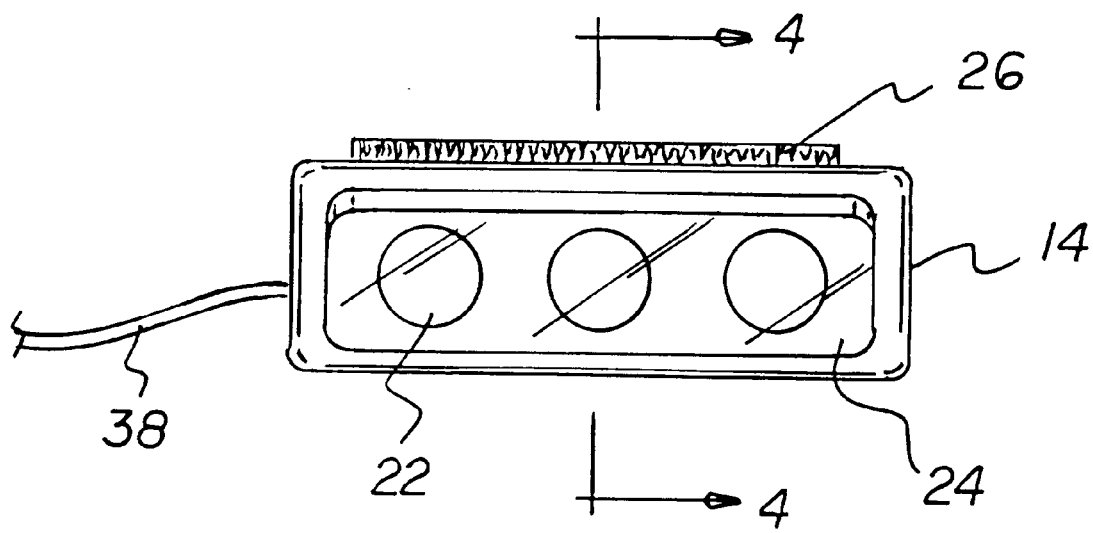
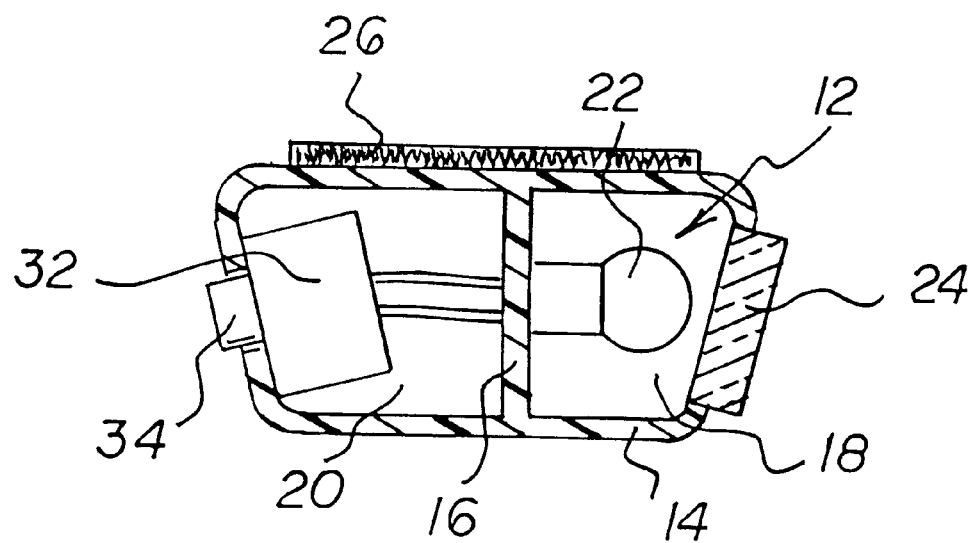

HEAD MOUNTED ILLUMINATION DEVICE

BACKGROUND OF THE INVENTION

1. Field of the Invention

The present invention relates to a head mounted illumination device and more particularly pertains to securing a mouthpiece of a headset to allow for hands free illumination of a particular area with a head mounted illumination device.

2. Description of the Prior Art

The use of lighting devices is known in the prior art. More specifically, lighting devices heretofore devised and utilized for the purpose of illuminating an area are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,969,069 to Eichost; U.S. Pat. No. 5,353,205 to Hudak; and U.S. Pat. No. 5,438,494 to Harlan.

While these devices fulfill their respective, particular objective and requirements, the aforementioned patents do not describe a head mounted illumination device for securing a mouthpiece of a headset to allow for hands free illumination of a particular area.

In this respect, the head mounted illumination device according to the present invention substantially departs from the conventional concepts and designs of the prior art, and in doing so provides an apparatus primarily developed for the purpose of securing a mouthpiece of a headset to allow for hands free illumination of a particular area.

Therefore, it can be appreciated that there exists a continuing need for new and improved head mounted illumination device which can be used for securing a mouthpiece of a headset to allow for hands free illumination of a particular area. In this regard, the present invention substantially fulfills this need.

SUMMARY OF THE INVENTION

In the view of the foregoing disadvantages inherent in the known types of lighting devices now present in the prior art, the present invention provides an improved head mounted illumination device. As such, the general purpose of the present invention, which will be described subsequently in greater detail, is to provide a new and improved head mounted illumination device and method which has all the advantages of the prior art and none of the disadvantages.

To attain this, the present invention essentially comprises a light source disposed within a housing. The housing has a generally rectangular configuration. The housing is defined by a top wall, a bottom wall, a front wall, a back wall, opposed side walls, and a hollow interior. A divider panel extends between the top wall and the bottom wall within the hollow interior to create a forward chamber and a rearward chamber. The light source includes a plurality of lights disposed within the forward chamber. The light source includes an optical magnifying glass disposed within the front wall. The top wall of the housing has a first section of hook and loop material disposed thereon. A second section of hook and loop material is securable to a mouthpiece of a headset for mating with the first section of hook and loop material to facilitate securement of the light source to the headset. An activation button is disposed within the rearward chamber of the housing. The activation button is in communication with the light source. The activation button includes a contact switch extending outwardly of the back wall of the housing. The contact switch aligns with a lip of a user. A power source is securable to the headset. The power source includes wiring extending outwardly therefrom. The wiring couples with the activation button to facilitate communication therewith. At least one pliable clip couples the wiring to the headset.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved head mounted illumination device which has all the advantages of the prior art lighting devices and none of the disadvantages.

It is another object of the present invention to provide a new and improved head mounted illumination device which may be easily and efficiently manufactured and marketed.

It is a further object of the present invention to provide a new and improved head mounted illumination device which is of durable and reliable construction.

An even further object of the present invention is to provide a new and improved head mounted illumination device which is susceptible of a low cost of manufacture with regard to both materials and labor, and which accordingly is then susceptible of low prices of sale to the consuming public, thereby making such a head mounted illumination device economically available to the buying public.

Even still another object of the present invention is to provide a new and improved head mounted illumination device for securing a mouthpiece of a headset to allow for hands free illumination of a particular area.

Lastly, it is an object of the present invention to provide a new and improved head mounted illumination device including a light source disposed within a housing. The light source includes a plurality of lights disposed within the housing. The housing is securable to a mouthpiece of a headset to facilitate securement of the light source to the headset. An activation button is disposed within the housing. The activation button is in communication with the light source. The activation button includes a contact switch extending outwardly of the housing. The contact switch aligns with a lip of a user. A power source is securable to the headset. The power source includes wiring extending outwardly therefrom. The wiring couples with the activation button to facilitate communication therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front view of the present invention as taken along line 3—3 of FIG. 2.

FIG. 4 is a cross-sectional view of the present invention as taken along line 4—4 of FIG. 3.

The same reference numerals refer to the same parts through the various figures.

Description of the Preferred Embodiment

Figure 1:
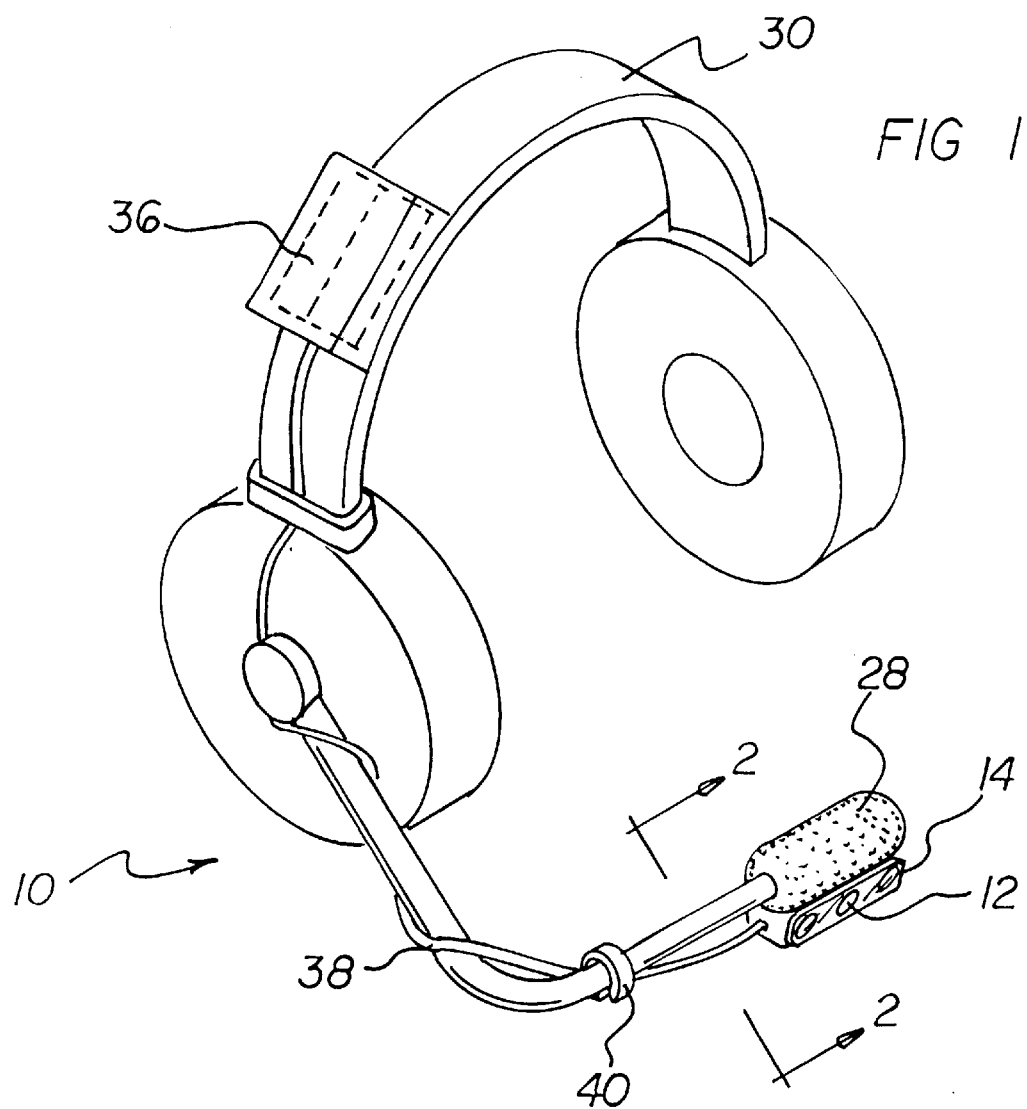
FIG. 1 is a perspective view of the preferred embodiment of the head mounted illumination device constructed in accordance with the principles of the present invention.
Figure 2:
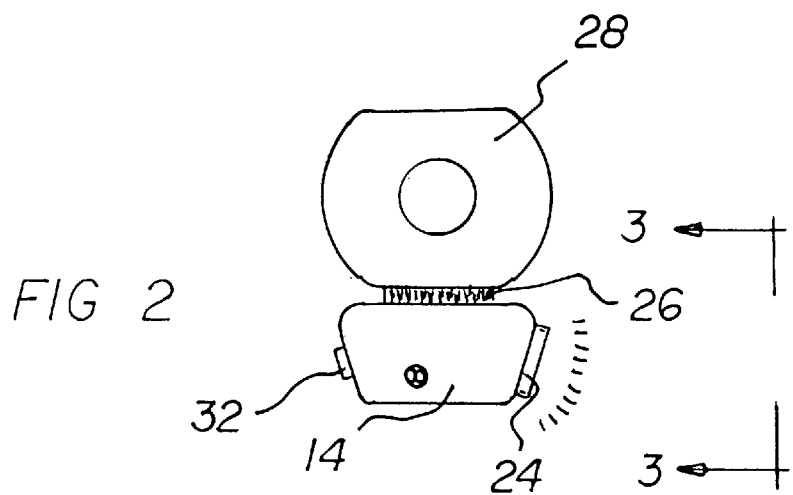
FIG. 2 is a cross-sectional view of the present invention as taken along line 2—2 of FIG. 1.

With reference now to the drawings, and in particular, to FIGS. 1 through 5 thereof, the preferred embodiment of the new and improved head mounted illumination device embodying the principles and concepts of the present invention and generally designated by the reference number 10 will be described.

Specifically, it will be noted in the various Figures that the device relates to a head mounted illumination device for securing a mouthpiece of a headset to allow for hands free illumination of a particular area. In its broadest context, the device consists of a light source, an activation button, and a power source. Such components are individually configured and correlated with respect to each other so as to attain the desired objective.

The light source 12 is disposed within a housing 14. The housing 14 has a generally rectangular configuration. The housing is defined by a top wall, a bottom wall, a front wall, a back wall, opposed side walls, and a hollow interior. A divider panel 16 extends between the top wall and the bottom wall within the hollow interior to create a forward chamber 18 and a rearward chamber 20. The light source 12 includes a plurality of lights 22 disposed within the forward chamber 18. The light source 12 includes an optical magnifying glass 24 disposed within the front wall. The top wall of the housing 14 has a first section of hook and loop material 26 disposed thereon. A second section of hook and loop material is securable to a mouthpiece 28 of a headset 30 for mating with the first section of hook and loop material 26 to facilitate securement of the light source 12 to the headset 30.

The activation button 32 is disposed within the rearward chamber 20 of the housing 14. The activation button 32 is in communication with the light source 12. The activation button 32 includes a contact switch 34 extending outwardly of the back wall of the housing 14. The contact switch 34 aligns with a lip of a user. The contact switch 34 is designed to be soft to the touch whereby a user can simply depress it with their lower or upper lip to activate the lights 22.

The power source 36 is securable to the headset 30. The power source 36 is preferably secured to the headset 30 along the headband thereof. Note FIG. 1. The use of some type of hook and loop fastener is the preferred means of securement. The power source 36 utilized in the preferred embodiment are batteries. The power source 36 includes wiring 38 extending outwardly therefrom. The wiring 38 couples with the activation button 32 to facilitate communication therewith. At least one pliable clip 40 couples the wiring 38 to the headset 30.

Figure 5:
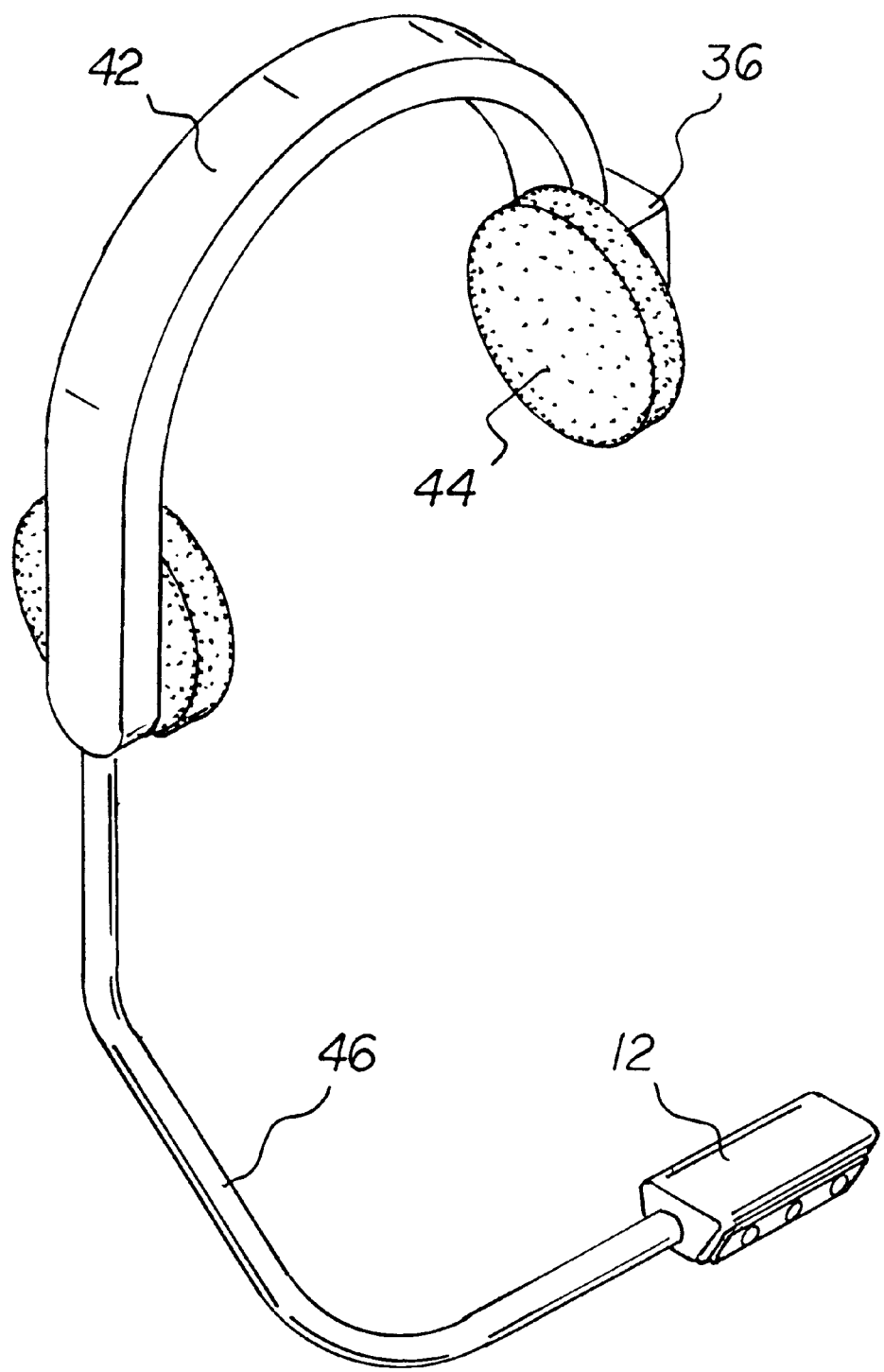
FIG. 5 is a perspective view of an alternate embodiment of the present invention.

A second embodiment of the present invention is shown in FIG. 5 and includes substantially all of the components of the present invention further including a headset defined by an arcuate upper portion 42 dimensioned for receiving a user's head therein. The arcuate upper portion 42 has a pair of ear pads 44 disposed on free ends thereof. One of the free ends has a generally L-shaped lower portion 46 extending downwardly therefrom. The lower portion has a free lower end positionable in front of a mouth of the user.

The light source 12 is disposed within a housing 14. The housing 14 has a generally rectangular configuration. The housing is defined by a top wall, a bottom wall, a front wall, a back wall, opposed side walls, and a hollow interior. A divider panel extends between the top wall and the bottom wall within the hollow interior to create a forward chamber and a rearward chamber. The light source includes a plurality of lights disposed within the forward chamber. The light source includes an optical magnifying glass disposed within the front wall. The housing 14 is secured to the free end of the lower portion 46 of the headset.

The activation button is disposed within the rearward chamber of the housing. The activation button is in communication with the light source. The activation button includes a contact switch extending outwardly of the back wall of the housing. The contact switch aligns with a lip of a user. The contact switch is designed to be soft to the touch whereby a user can simply depress it with their lower or upper lip to activate the lights.

The power source 36 is securable to the headset. In this embodiment, the power source 36 is secured to arcuate upper portion 42 opposed from one of the ear pads 44. The power source 36 includes wiring extending outwardly therefrom. The wiring couples with the activation button to facilitate communication therewith.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A head mounted illumination device for securing a mouthpiece of a headset to allow for hands free illumination of a particular area comprising, in combination:

a light source disposed within a housing, the housing having a generally rectangular configuration, the housing being defined by a top wall, a bottom wall, a front wall, a back wall, opposed side walls, and a hollow interior, a divider panel extends between the top wall and the bottom wall within the hollow interior to create a forward chamber and a rearward chamber, the light source including a plurality of lights disposed within the forward chamber, the light source including an optical magnifying glass disposed within the front wall, the top wall of the housing having a first section of hook and loop material disposed thereon, a second section of hook and loop material secured to a mouthpiece of a headset for mating with the first section of hook and loop material to facilitate securement of the light source to the headset;

an activation button disposed within the rearward chamber of the housing, the activation button being in communication with the light source, the activation button including a contact switch extending outwardly of the back wall of the housing, the contact switch aligning with a lip of a user;

a power source securable to the headset, the power source including wiring extending outwardly therefrom, the wiring coupling with the activation button to facilitate communication therewith, at least one pliable clip coupling the wiring to the headset.

2. A head mounted illumination device for securing a mouthpiece of a headset to allow for hands free illumination of a particular area comprising, in combination:

a light source disposed within a housing having an optical magnifying glass disposed within a front wall of said housing, the light source including a plurality of lights disposed within the housing, the housing secured to a mouthpiece of a headset to facilitate securement of the light source to the headset;

an activation button disposed within the housing, the activation button being in communication with the light source, the activation button including a contact switch extending outwardly of the housing, the contact switch aligning with a lip of a user;

a power source securable to the headset, the power source including wiring extending outwardly therefrom, the wiring coupling with the activation button to facilitate communication therewith.

3. A head mounted illumination device for securing a mouthpiece of a headset to allow for hands free illumination of a particular area comprising, in combination:

a top wall of the housing having a first section of hook and loop material disposed thereon, a second section of hook and loop material secured to the mouthpiece of the headset for mating with the first section of hook and loop material to facilitate securement of a light source to the headset;

the light source disposed within a housing, the light source including a plurality of lights disposed within the housing, the housing secured to the mouthpiece of the headset to facilitate securement of the light source to the headset;

an activation button disposed within the housing, the activation button being in communication with the light source, the activation button including a contact switch extending outwardly of the housing, the contact switch aligning with a lip of a user;

a power source securable to the headset, the power source including wiring extending outwardly therefrom, the wiring coupling with the activation button to facilitate communication therewith.

4. A head mounted illumination device for securing a mouthpiece of a headset to allow for hands free illumination of a particular area comprising, in combination:

a headset defined by an arcuate upper portion dimensioned for receiving a user's head therein, the arcuate upper portion having a pair of ear pads disposed on free ends thereof, one of the free ends having a L-shaped lower portion extending downwardly therefrom, the lower portion having a free lower end positionable in front of a mouth of the user;

a light source disposed within a housing, the housing having a generally rectangular configuration, the housing being defined by a top wall, a bottom wall, a front wall, a back wall, opposed side walls, and a hollow interior, a divider panel extends between the top wall and the bottom wall within the hollow interior to create a forward chamber and a rearward chamber, the light source including a plurality of lights disposed within the forward chamber, the light source including an optical magnifying glass disposed within the front wall, the housing secured to the free end of the lower portion of the headset;

an activation button disposed within the rearward chamber of the housing, the activation button being in communication with the light source, the activation button including a contact switch extending outwardly of the back wall of the housing, the contact switch aligning with a lip of the user;

a power source secured to the headset, the power source including wiring extending outwardly from the headset, the wiring coupling with the activation button to facilitate communication therewith.

* * * * *